(12) United States Patent
Krause et al.

(10) Patent No.: US 7,798,933 B2
(45) Date of Patent: Sep. 21, 2010

(54) MOTOR VEHICLE TRANSMISSION DEVICE AND MOTOR VEHICLE DRIVETRAIN HAVING A MOTOR VEHICLE TRANSMISSION DEVICE

(75) Inventors: Thorsten Krause, Buehl (DE); Jan Loxtermann, Baden-Baden (DE)

(73) Assignee: Luk Lamellen und Kupplungsbau Beteiligungs KG, Buehl (DE)

( * ) Notice: Subject to any disclaimer, the term of this patent is extended or adjusted under 35 U.S.C. 154(b) by 0 days.

(21) Appl. No.: 12/426,348

(22) Filed: Apr. 20, 2009

(65) Prior Publication Data

US 2009/0203479 A1 Aug. 13, 2009

Related U.S. Application Data

(63) Continuation of application No. PCT/DE2007/001748, filed on Sep. 27, 2007.

(30) Foreign Application Priority Data

Oct. 21, 2006 (DE) ........................ 10 2006 049 734

(51) Int. Cl.
*F16H 3/62* (2006.01)
(52) U.S. Cl. .................................................... 475/275
(58) Field of Classification Search ......... 475/276–278, 475/284
See application file for complete search history.

(56) References Cited

U.S. PATENT DOCUMENTS

| 5,029,682 | A | * | 7/1991 | Maurer et al. ................... 475/28 |
| 5,279,398 | A | * | 1/1994 | Graton et al. ............... 192/3.29 |
| 5,772,548 | A | * | 6/1998 | Park ............................ 475/44 |
| 6,042,498 | A | * | 3/2000 | Kashiwase .................. 475/210 |
| 6,159,123 | A | * | 12/2000 | Gumpoltsberger .......... 475/116 |
| 6,827,664 | B2 | * | 12/2004 | Stevenson et al. ........... 475/275 |
| 7,029,417 | B2 | * | 4/2006 | Borgerson et al. .......... 475/284 |
| 7,108,628 | B2 | * | 9/2006 | Ziemer et al. ............... 475/278 |
| 7,247,119 | B2 | * | 7/2007 | Andres ....................... 475/275 |
| 2005/0054474 | A1 | | 3/2005 | Tiesler et al. |
| 2006/0172851 | A1 | | 8/2006 | Diosi et al. |

FOREIGN PATENT DOCUMENTS

| DE | 31 39 658 A | 4/1983 |
| DE | 44 22 732 A | 6/1995 |
| DE | 100 24 281 | 11/2001 |
| WO | 03/095865 A | 11/2003 |

* cited by examiner

*Primary Examiner*—Ha D. Ho
(74) *Attorney, Agent, or Firm*—Lucas & Mercanti, LLP

(57) ABSTRACT

A motor vehicle transmission device which, in order to form a plurality of gears, forms a Lepelletier transmission. At least one torsional damper is provided in the Lepelletier transmission, and also to a motor vehicle drive train, which has a Lepelletier motor vehicle transmission device.

11 Claims, 16 Drawing Sheets

MOTOR VEHICLE TRANSMISSION DEVICE AND MOTOR VEHICLE DRIVETRAIN HAVING A MOTOR VEHICLE TRANSMISSION DEVICE

This application is a continuation of PCT/DE2007/001748 filed Sep. 27, 2007, which in turn claims the priority of DE 10 2006 049 734.1 filed Oct. 21, 2006, the priority of both applications is hereby claimed and both applications are incorporated by reference herein.

BACKGROUND OF THE INVENTION

The invention relates to a motor vehicle transmission device which has a Lepelletier transmission, and to a motor vehicle drive train comprising such a motor vehicle transmission device.

A wide variety of principles on which motor vehicle transmission devices can be based are known in the prior art. For example, it is known that motor vehicle transmissions are configured with the classic intermediate transmission design. It is also known to use a classic planetary transmission as a motor vehicle transmission. As far as the applicant is aware, at least internally, the Lepelletier principle is also used as a basis for a series of modern six gear speed automatic transmissions.

In the last-mentioned type of transmission, that is to say a transmission which is based on a Lepelletier principle or is a Lepelletier transmission, there are, due to the principle involved, depending on the gear speed, natural modes whose natural frequency can be in the range in which driving is possible, which natural frequency is excited by the torsional vibration of the engine and therefore has a disruptive effect. This can take the form of, for example, humming or rattling. FIG. 17 is a representation of exemplary natural modes which relate to a quite specific motor vehicle transmission and a specific motor vehicle drive train, but in principle can also have a quantitative meaning.

SUMMARY OF THE INVENTION

Against this background, the object of the present invention is to provide a motor vehicle transmission which has a Lepelletier transmission and which permits good driving comfort. Additionally, the present invention provides a motor vehicle drive train. Preferred developments are subject matter of the subclaims.

The invention therefore proposes, in particular, a motor vehicle transmission device which forms a Lepelletier transmission for forming a plurality of gear speeds. At least one torsion damper is provided in this Lepelletier transmission in this motor vehicle transmission device. This torsion damper can have a plurality of spring elements, for example helical springs.

As mentioned, a torsion damper is arranged in the transmission.

There is, in particular, provision for a first component transmission and a second component transmission of the Lepelletier transmission to be provided. The first component transmission here has a sun gear, a ring gear, a plurality of planet gears and a planet carrier.

In particular there is also provision that the second component transmission forms a Ravigneaux transmission. This Ravigneaux transmission here has a small sun gear, a large sun gear, a plurality of short planet gears, a plurality of long planet gears, a common planet carrier for the short and long planet gears and a ring gear. In this context, the short planet gears engage with their tooth systems in the teeth of the sun gear. The long planet gears engage with their tooth systems in the short planet gears, in the large sun gear and in the ring gear.

In addition, there is, in particular, provision that a plurality of clutches are provided in the Lepelletier transmission, specifically preferably as follows: a first clutch, which is also referred to as "clutch A", is arranged in such a way that it is positioned in the torque flux between the planet carrier of the first component transmission and the small sun gear of the Ravigneaux transmission, and can be opened and closed. A second clutch, also referred to as "clutch B", is arranged in such a way that it is arranged in the torque flux between the planet carrier of the first component transmission and the large sun gear of the Ravigneaux transmission. A third clutch, which is also referred to as "clutch E", is arranged in such a way that it can be used to couple the ring gear of the first component transmission to the planet carrier of the Ravigneaux transmission and it can be used to release this coupling.

By way of example, a number of positions at which a torsion damper, which is provided in the Lepelletier transmission according to the invention, can be arranged will be specified in the text which follows. It is to be noted that there is an entire series of possible ways of arranging a torsion damper in, since the transmission structure is very complex and operates with power splitting.

A first exemplary position is such that it is positioned in the force flux between the first planetary gear train or the planet gears or the planet carrier of the first component transmission and the clutch A.

A second exemplary position is such that it is positioned in the force flux from the first planetary gear train or the planets of the first component transmission or the planet carrier of the first component transmission to the clutch B, specifically in particular between the clutch A and the clutch B.

Further exemplary positions are such that the torsion damper is positioned in the force flux upstream or downstream of the clutch E to the rear planetary gear train or the Ravigneaux transmission.

Further exemplary positions are such that the torsion damper is positioned in the force flux of the intermediate shaft and the sun shaft 2 or the sun shaft 3, or on a component which is coupled to the planet carrier of the Ravigneaux transmission or on a component which is fixedly coupled to the small sun gear, or on a component which is fixedly coupled to the large sun gear of the Ravigneaux transmission.

The above-mentioned exemplary variants show influence on the insulation with respect to torsional vibrations. It may be provided that this gain in insulation is not present in all gear speeds as a result of the complex transmission structure. However, it may also be provided that the gain in insulation is present in all gear speeds, in particular despite the complex transmission structure. In one advantageous refinement, the decision as to which torsion damper is used in the overall system is made in accordance with the application. It may also be provided that a plurality of torsion dampers are provided within the Lepelletier transmission.

As far as the applicant is aware, a transmission-internal damper has hitherto not been used in a Lepelletier transmission in order, for example, to reduce disruptive noise such as humming or rattling or the like.

It is to be noted that the problems mentioned at the beginning will arguably occur in all transmissions of the Lepelletier type due to the principle involved. If not for the present invention, this problem would continue to increase since, as a result of the new stricter consumption objectives, automotive manufacturers will wish to drive with ever less slip at the converter lockup clutch, and therefore will be increasingly confronted with this problem. At least through exemplary embodiments of the invention it has now become possible to at least reduce this problem. It is to be noted that under certain circumstances an improvement could also be achieved through significantly higher slip on the converter lockup clutch (fuel consumption rises) or significantly more complex torsion dampers in or on the converter (DTD, RTD, LFD, ZMS, . . . ), albeit with a higher fuel consumption or at higher cost or with a larger weight or with an increased installation space requirement.

In addition, it has become apparent that as a rule a torsion damper in the converter is not sufficient to prevent the natural frequencies in question from giving rise to problems.

In addition, it is to be noted that in a specific drive train which has been examined by the applicant the above-mentioned problems occurred mainly in the fourth to sixth gear speed, but in different forms. An analysis of the natural modes in question here has shown that a natural mode of the transmission is involved and the fifth gear speed is generally the most critical one. However, a torsion damper in the converter can influence this natural mode only to a limited degree and then also can affect it positively only at very large cost. However, it cannot be displaced to other rotational speed ranges (super-critical/sub-critical). In contrast, it has now been possible to achieve significant improvements by means of the invention and its developments.

BRIEF DESCRIPTION OF THE DRAWINGS

Exemplary embodiments of the invention will now be explained in more detail below with reference to the appended figures, without restricting the invention. Of said figures.

DETAILED DESCRIPTION OF THE INVENTION

Figure 1:
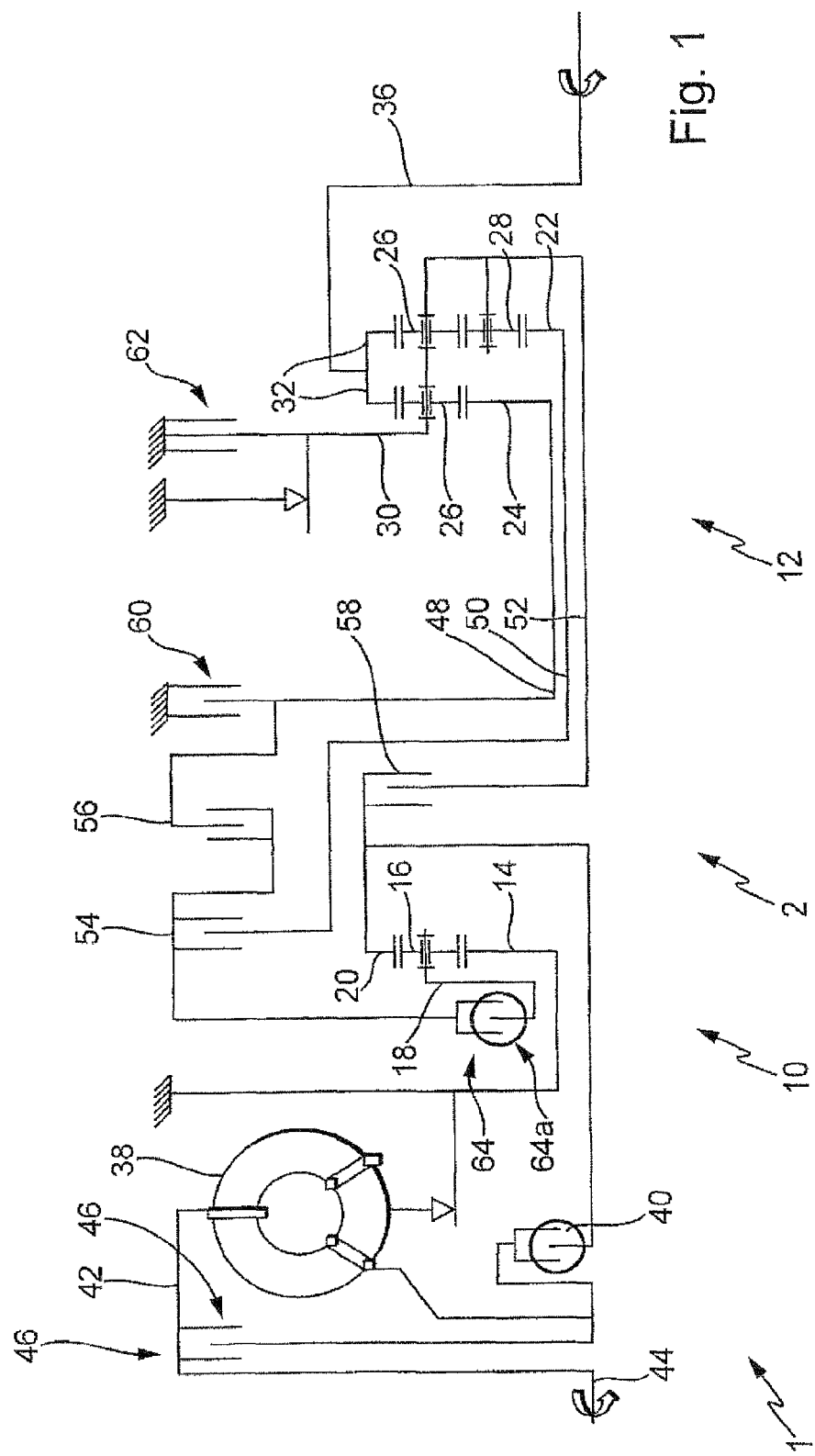
FIG. 1 shows a first exemplary embodiment of the invention.

FIGS. 1 to 5 show, each in a highly schematic illustration or in the manner of a basic circuit diagram, five exemplary refinements of a motor vehicle drive train according to the invention in a partial illustration. In addition, FIGS. 1 to 5 show five exemplary refinements of a motor vehicle transmission device 2 according to the invention, each in a schematic illustration or illustrated as a basic circuit diagram. The respective motor vehicle transmission device is in each case a component of the corresponding motor vehicle drive train 1 here.

In the text which follows, the basic design of the configurations shown in FIGS. 1 to 5 will first be explained before then details are given on the respective differences between the configurations illustrated in said Figures.

A motor vehicle transmission device 2, which has a Lepelletier transmission or is configured as Lepelletier transmission, is provided in the motor vehicle drive train 1.

The motor vehicle transmission device 2 has a first component transmission 10 and a second component transmission 12. The first component transmission 10 is configured as a planetary transmission or as a (first) planetary gear train. The second component transmission 12 is configured as a Ravigneaux transmission or as a combination of a second and a third planetary gear train.

Accordingly, the first component transmission 10 of the motor vehicle transmission device 2 has a sun gear 14, a planet gear 16, a planet carrier 18 and a ring gear 20.

As this is typically the case with a Ravigneaux transmission, the second component transmission 12 has a small sun gear 22, a large sun gear 24, long planet gears 26, short planet gears 28, a common planet carrier 30 for the long planet gears 26 and the short planet gears 28 and a (common) ring gear 32. In this context, the long planet gears 26 each engage with their tooth systems in the tooth system of the large sun gear 24 on the one hand, and in the tooth system of the ring gear 32 on the other. The respective tooth systems of the short planet gears engage, on the one hand, in the tooth system of the small sun gear 22 and, on the other hand, in each case in a tooth system of a respective long planet gear 26.

In addition, an input shaft or an input component 34 of the first component transmission 10 is provided, as well as an output component or an output shaft 36 of the second component transmission 12.

The output shaft 36 or the output component 36—the term output shaft 36 is used below for the sake of simplification—can be installed in such a way that the torque flowing through the transmission device is conducted by the output shaft on the output side in the direction of a differential of a motor vehicle drive train or in the direction of the drive axles of a motor vehicle.

The input component or the input shaft 34 mentioned above—referred to below as input shaft 34 for the sake of simplification—transmits torque from the direction of an internal combustion engine of a motor vehicle to the first component transmission 10.

In addition, in the configurations shown in FIGS. 1 to 5, a torque converter 38 and a torsion vibration damper 40 are provided. The torque converter 38 has a converter housing 42. It may be provided that the torsion vibration damper 40 and the torque converter 38 are accommodated in the (common) converter housing 42.

The converter housing 42 is coupled in a rotationally fixed fashion to an engine shaft 44 or to a shaft 44 which has a drive-transmitting connection to such an engine shaft. In addition, a converter lockup clutch 46 is provided which is provided in such a way that when the converter lockup clutch 46 is open the torque which comes from the engine shaft 44 is transmitted via the torque converter 38 in the direction of the input shaft 34, and when the torque lockup clutch is closed the torque flowing from the engine shaft 44 to the input shaft 34 can flow in such a way that the converter 38 is bypassed.

In addition, a second sun shaft 48, a third sun shaft 50 and an intermediate shaft 52 are provided between the first component transmission 10 and the second component transmission 12—or at the interface between these two transmissions. However, it is to be noted in this context that the second sun shaft 48, the third sun shaft 50 and the intermediate shaft 52 may be a shaft in the classic sense but do not have to be and instead can each also be a torque-transmitting component of a different design. The large sun gear 24 of the second component transmission 12 is coupled in a rotationally fixed fashion to the second sun shaft 48, the third sun shaft 50 is coupled in a rotationally fixed fashion to the small sun gear 22, and the intermediate shaft 52 is coupled in a rotationally fixed fashion to the planet carrier 30. In order to produce the different gear stages, the first component transmission 10 can be shifted with the second component transmission 10 in different ways. For this purpose, that is to say in order to bring about the different shifting operations and engage the different gear speeds, a first clutch 54, which is also referred to as "clutch A", a second clutch 56, which is also referred to as "clutch B", and a third clutch 58, which is also referred as "clutch E", are provided. The clutches 54, 56 and 58 in question are multi-disk clutches in an advantageous embodiment.

The first clutch 54 (clutch A) is respectively arranged in the configurations according to FIGS. 1 to 5 in such a way that it is arranged between or in the force flux or torque flux between the planet carrier 18 of the first component transmission 10 and third sun shaft 50, or the small sun gear 22 of the second component transmission 12, with the result that a corresponding torque connection can be produced by closing the first clutch 54, and this torque connection can be disconnected by opening the first clutch 54.

The second clutch 56 (clutch B) is arranged in the configurations according to FIGS. 1 to 5 in such a way that it is arranged between or in the force flux or torque flux between the planet carrier 18 of the first component transmission 10 and second sun shaft 48, or the large sun gear 24 of the second component transmission 12, with the result that a corresponding torque connection can be produced by closing the second clutch 56, or this torque connection can be disconnected by opening the second clutch 56.

In the configurations according to FIGS. 1 to 5, the third clutch 58 (clutch E) is arranged in each case in such a way that it is arranged between the ring gear 20 of the first component transmission 10 and the intermediate shaft 52 or the planet carrier 30 of the second component transmission 12 in such a way that by means of this third clutch 58 it is possible to couple, in an essentially rotationally fixed fashion, the ring gear 20 of the first component transmission 10 to the intermediate shaft 52 or the planet carrier 30 of the second component transmission 12, and to release such a rotationally fixed coupling.

In addition, in the configurations according to FIGS. 1 to 5, a fourth clutch 60 and a fifth clutch 62 are provided. The fourth clutch 60 and the fifth clutch 62 can, for example, each be embodied as a multi-disk clutch. The fourth clutch 60 is arranged and embodied in such a way that this fourth clutch 60 can be used, in its closed position, to couple the second sun shaft 48 or the large sun gear 24 of the second component transmission 12 in a rotationally fixed fashion with respect to a housing, for example a transmission housing, and that this rotationally fixed coupling is released in the open position of this fourth clutch 60. The fifth clutch 62 is embodied and arranged in such a way that in its closed position the planet carrier 30 of the second component transmission 12 can be coupled in a rotationally fixed fashion to the housing, and this rotationally fixed connection can be released in an open position of this fifth clutch 62.

Figure 2:
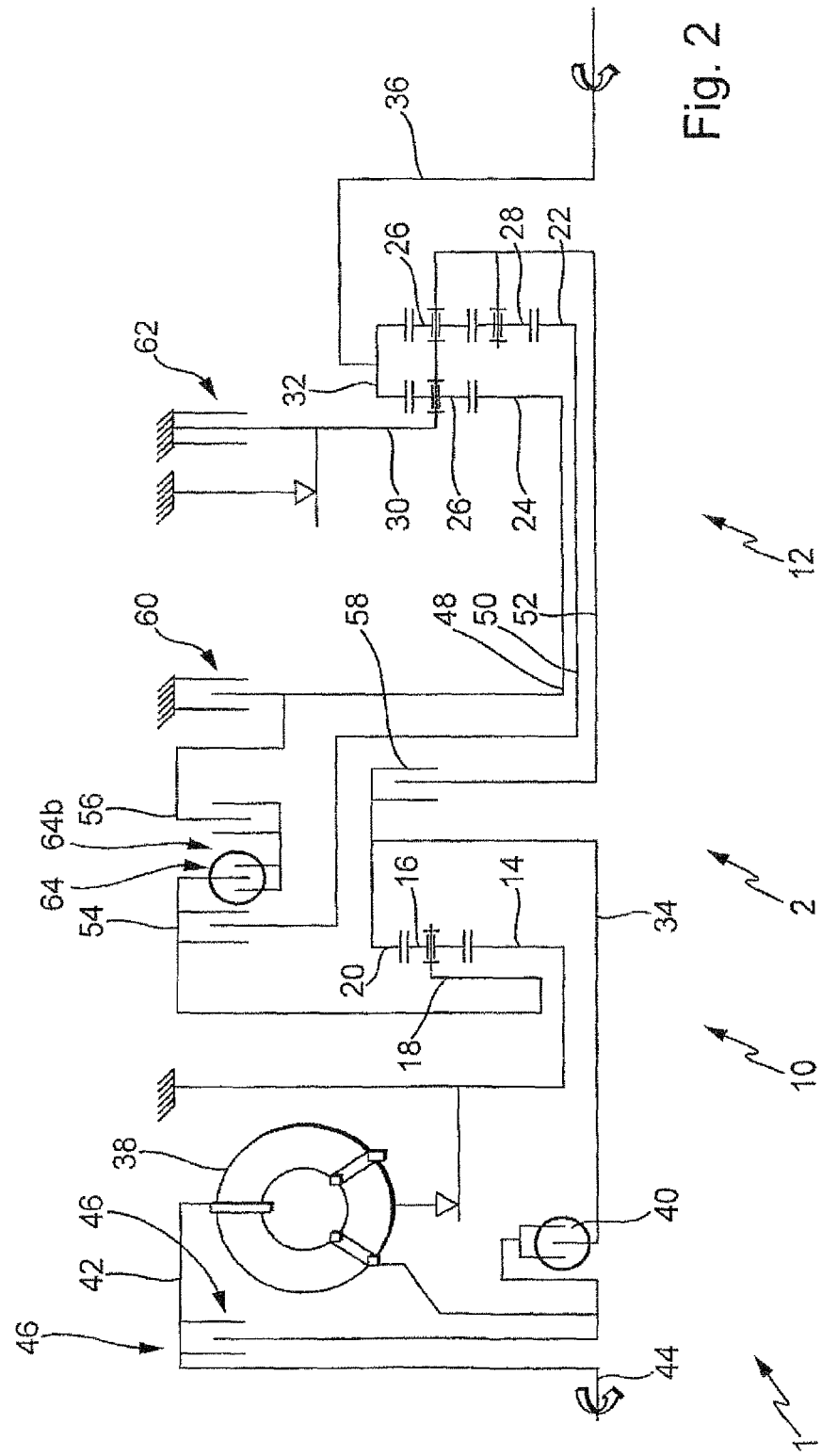
FIG. 2 shows a second exemplary embodiment of the invention.
Figure 3:
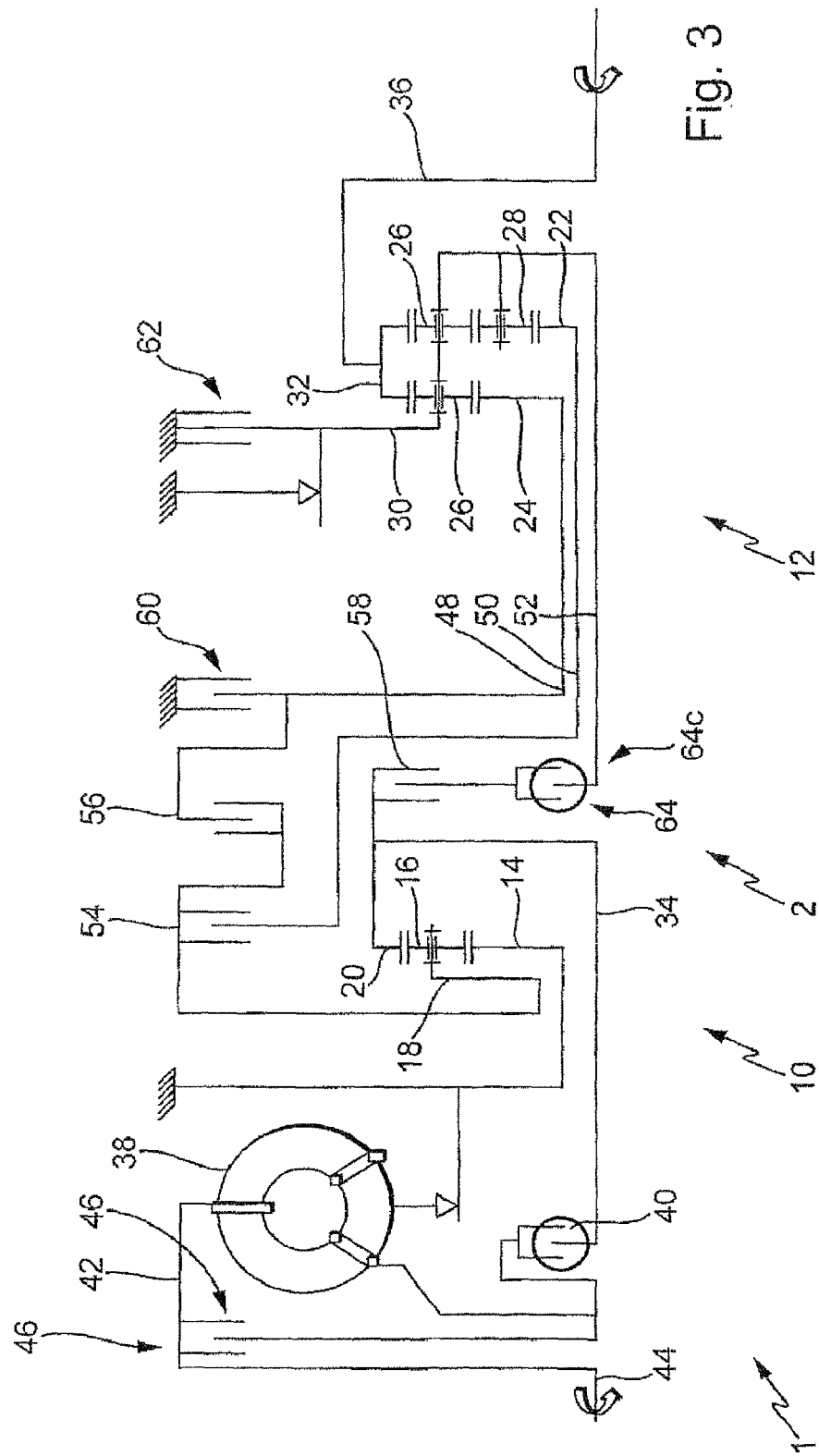
FIG. 3 shows a third exemplary embodiment of the invention.
Figure 4:
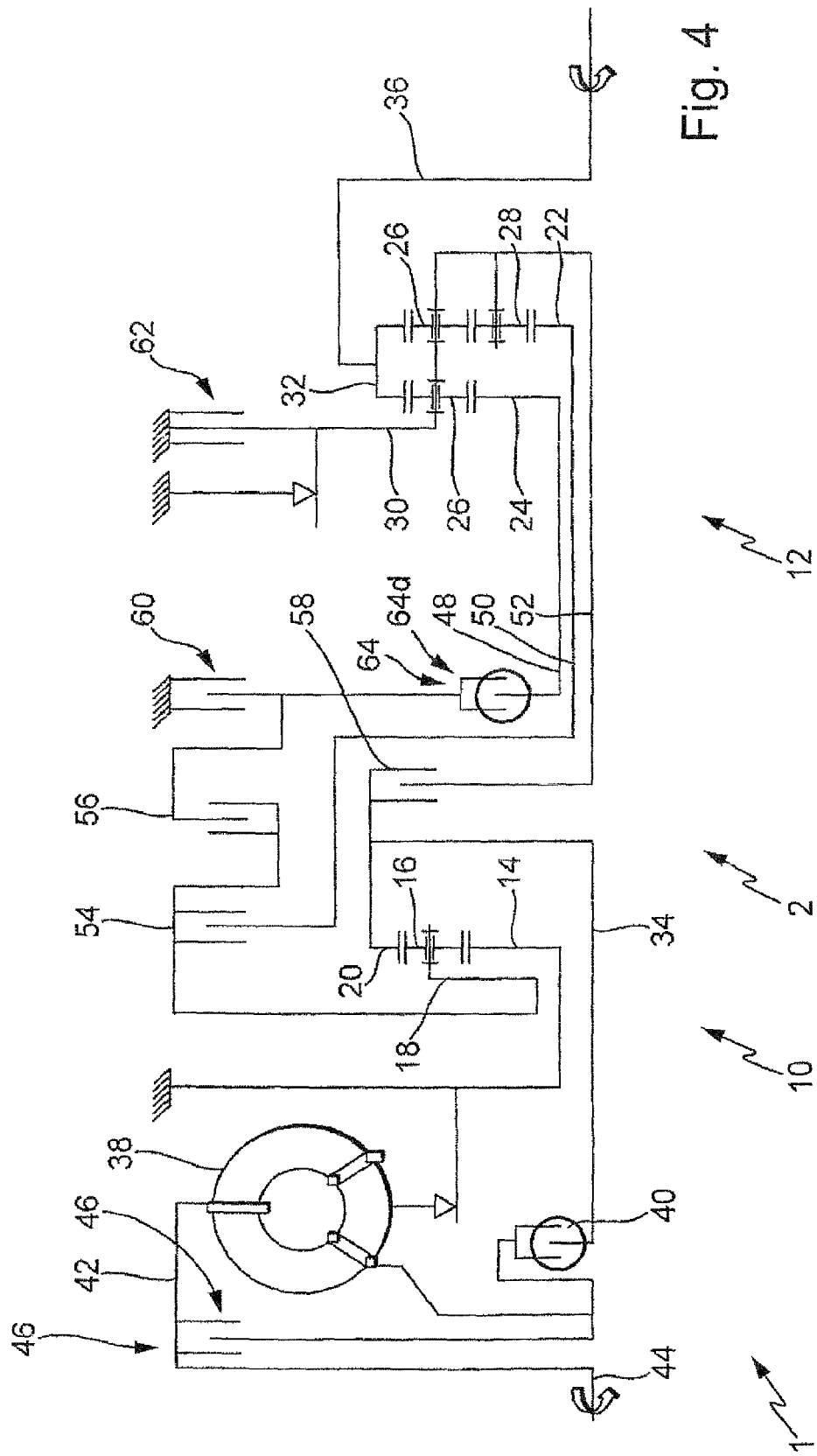
FIG. 4 shows a fourth exemplary embodiment of the invention.
Figure 5:
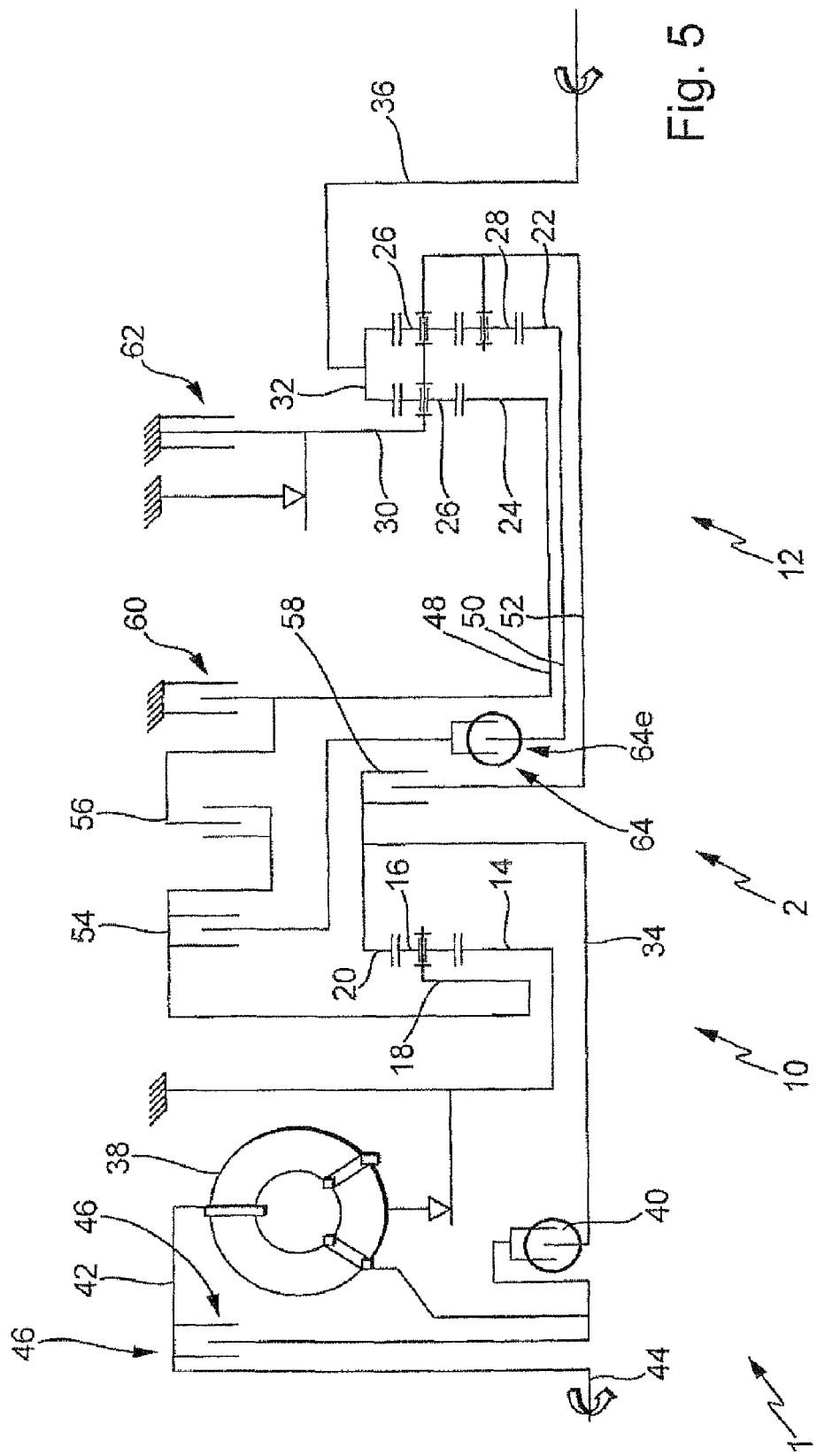
FIG. 5 shows a fifth exemplary embodiment of the invention.

In the configurations according to FIGS. 1 to 5, a torsion damper 64 is provided or arranged inside the Lepelletier transmission 2. For the sake of better differentiation, the torsion damper 64 in the configuration according to FIG. 1 is also referred to as "torsion damper 64*a*", the torsion damper 64 in the configuration according to FIG. 2 is also referred to as "torsion damper 64*b*", the torsion damper 64 in the configuration according to FIG. 3 is also referred to as "torsion damper 64*c*", the torsion damper 64 in the configuration according to FIG. 4 is also referred to as "torsion damper 64*d*", and the torsion damper 64 in the configuration according to FIG. 5 is also referred to as "torsion damper 64*e*".

The torsion damper 64 is, in particular, arranged within the Lepelletier transmission in such a way that if the corresponding torsion damper 64 were to be removed and instead the torque connection were to be disconnected at the respective location, it would no longer be possible to speak of a Lepelletier transmission and/or the functional capability of the Lepelletier transmission or its component transmissions would no longer be provided (completely). This will be explained in more detail below for the sake of better clarification. The configurations according to FIGS. 1 to 5 differ from one another essentially in the position in which the torsion damper 64 is arranged inside the Lepelletier transmission.

In the configuration according to FIG. 1, the torsion damper 64*a* is arranged between the first planetary gear train and the clutch A or between the planet gears 16 or the planet carrier 18 and the first clutch 54. This is, in particular, done in such a way that the first clutch is configured as a multi-disk clutch and the torsion damper 64*a* is integrated into the disk carrier which faces the disk carrier 18 or the planet 16 in the torque flux. This can be, for example, the radially outer disk carrier of the first clutch 54, into which disk carrier the torsion damper 64*a* is integrated. There may be provision, for example, for the corresponding disk carrier to be embodied in the manner of a shell, with said shell being split in such a way that two component shells or half shells are formed and these can be rotated in relation to one another, with these two half shells being supported on one another by means of springs. It may also be provided that in order to form a respective torsion damper 64 two half shells or two components are supported with respect to one another by means of springs, specifically in particular with the result that the springs are subjected to compressive or tensile loading when the half shells or components are rotated with respect to one another, in which case, in particular, it may be provided that one of these half shells or that one of these components is a disk carrier of a clutch, in particular clutch 54 or clutch 56 or clutch 58.

In the configuration according to FIG. 2, the torsion damper 64*b* is arranged in the force flux from the first planetary gear train to the clutch B or in the force flux or torque flux between the planets 16 or the planet carrier 18 and the second clutch 56, or between the clutch A and clutch B or between the first clutch 54 and the second clutch 56. In this configuration it may be provided, for example, that the first clutch 54 and the second clutch 56 are each embodied as a multi-disk clutch, wherein the torsion damper 64*b* is embodied between a disk carrier of the first clutch 54 and a disk carrier of the second clutch 56. This can be done, in particular, in such a way that a disk carrier of the first clutch 54 is supported by means of springs with respect to loading in the rotational direction on a disk carrier of the second clutch 56. It may, for example, be provided that the radially outer disk carrier of the first clutch 54 is supported by means of springs on the radially inner disk carrier of the second clutch 56 with respect to loading in the rotational direction.

In addition it may be provided that the torsion damper 64 is provided in the force flux upstream or downstream of the clutch E to the rear planetary gear train.

In the configuration according to FIG. 3 there is provision that the torsion damper 63 is provided in the force flux downstream of the clutch E to the rear planetary gear train or in the force flux between the third clutch 58 and the planet carrier 30, or inside the intermediate shaft 52. In particular, in the configuration according to FIG. 3 the torsion damper 64 is provided in the force flux between the ring gear 20, or a component which is connected in a rotationally fixed fashion to the ring gear 20, and the planet carrier 30.

In the configuration according to FIG. 4, the torsion damper 64d is provided in the force flux of the second sun shaft 48 or in the force flux between the second clutch 56 and the large sun gear 24 of the Ravigneaux transmission or in the force flux between the planet carrier 18 of the first component transmission 10 and the large sun gear 24 of the second component transmission or the Ravigneaux transmission 12.

In the configuration according to FIG. 5, the torsion damper 64e is arranged inside the third sun shaft 50 or in the force flux between the first clutch 54 and the small sun gear 22 of the Ravigneaux transmission or of the second component transmission 12 or in the force flux between the planet carrier 18 of the first component transmission 10 and the small sun gear 22 of the second component transmission 12 or of the Ravigneaux transmission.

It has been mentioned above that more details will be given once more on the fact that the torsion damper is arranged inside the Lepelletier transmission. This will now be done by clarifying differences from FIG. 10 in which a torsion damper which is provided within the Lepelletier transmission is missing; furthermore, the configuration according to FIG. 10 corresponds essentially to the configurations according to FIGS. 1 to 5.

Figure 8:
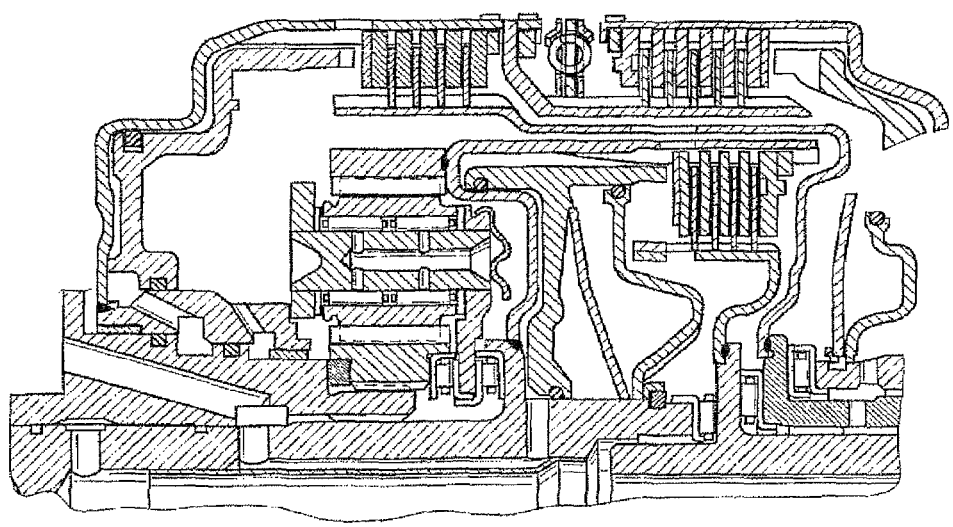
FIG. 8 shows an eighth exemplary embodiment of the invention.
Figure 9:
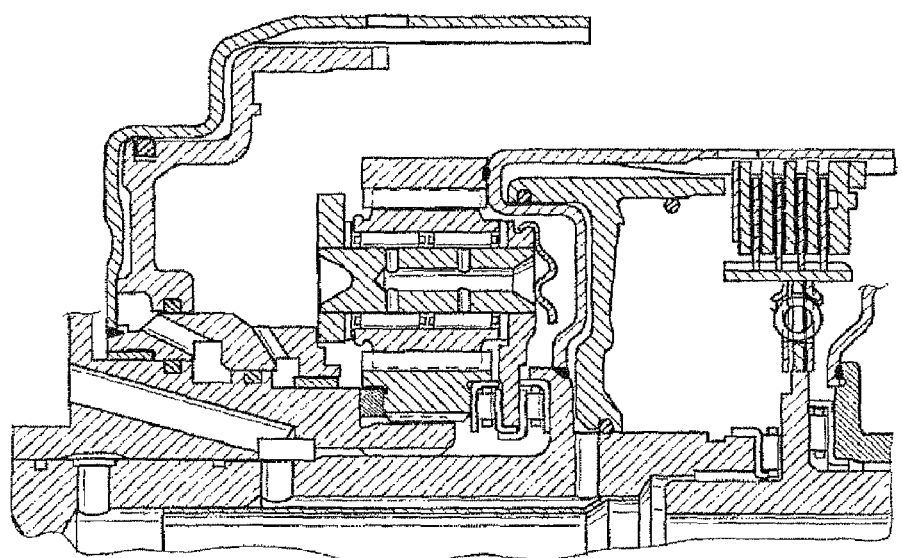
FIG. 9 shows a ninth exemplary embodiment of the invention.
Figure 10:
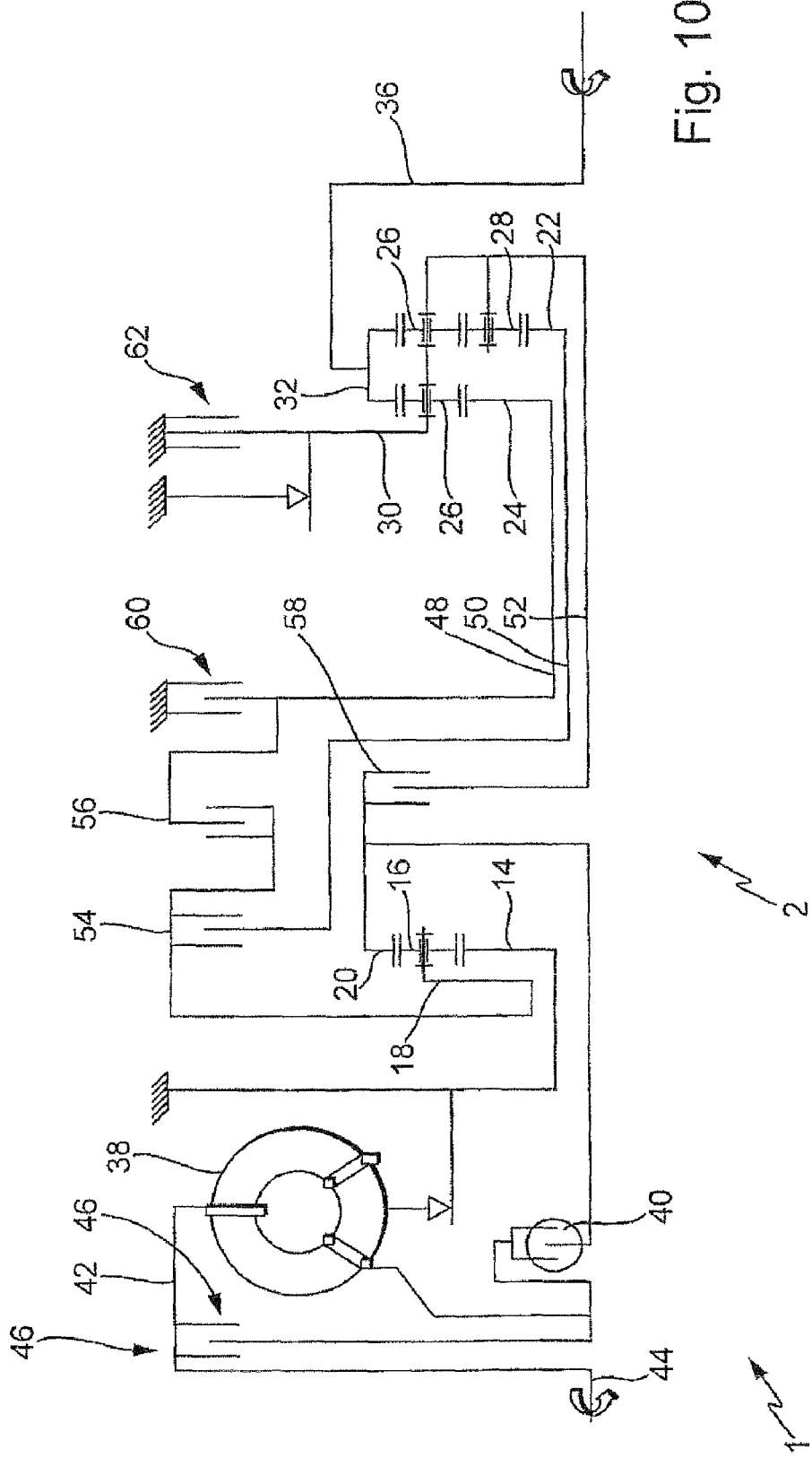
FIG. 10 shows a refinement without a torsion damper integrated in the Lepelletier transmission.

In the configuration according to FIG. 10, a torsion damper 40 is provided—as is, moreover, also the case in the configurations according to FIGS. 1 to 9. This torsion damper 40 is, however, not arranged within the Lepelletier transmission, or the Lepelletier transmission would remain such a transmission if the torsion damper 40 were removed in the configuration according to FIG. 10 and the corresponding position were embodied in such a way that torque cannot be transmitted there. In the configuration according to FIG. 10, this would in fact lead to a situation in which all the functionalities and couplings between the input component or the ring gear 20 of the Lepelletier transmission and the output component 36 would remain unchanged; in contrast, in the configurations according to FIGS. 1 to 5 the functionalities would be changed if the respective torsion damper 64 provided there within the Lepelletier transmission were removed and the torque transmitting path were disconnected at the pertinent point. To illustrate this by way of example, in the configuration according to FIG. 1, there would not be a coupling between the planet carrier or the planets 16 and the clutch 54 any more, if the torsion damper 46 there were to be removed and, at the pertinent location, a torque transmission were no longer possible.

Figure 6:
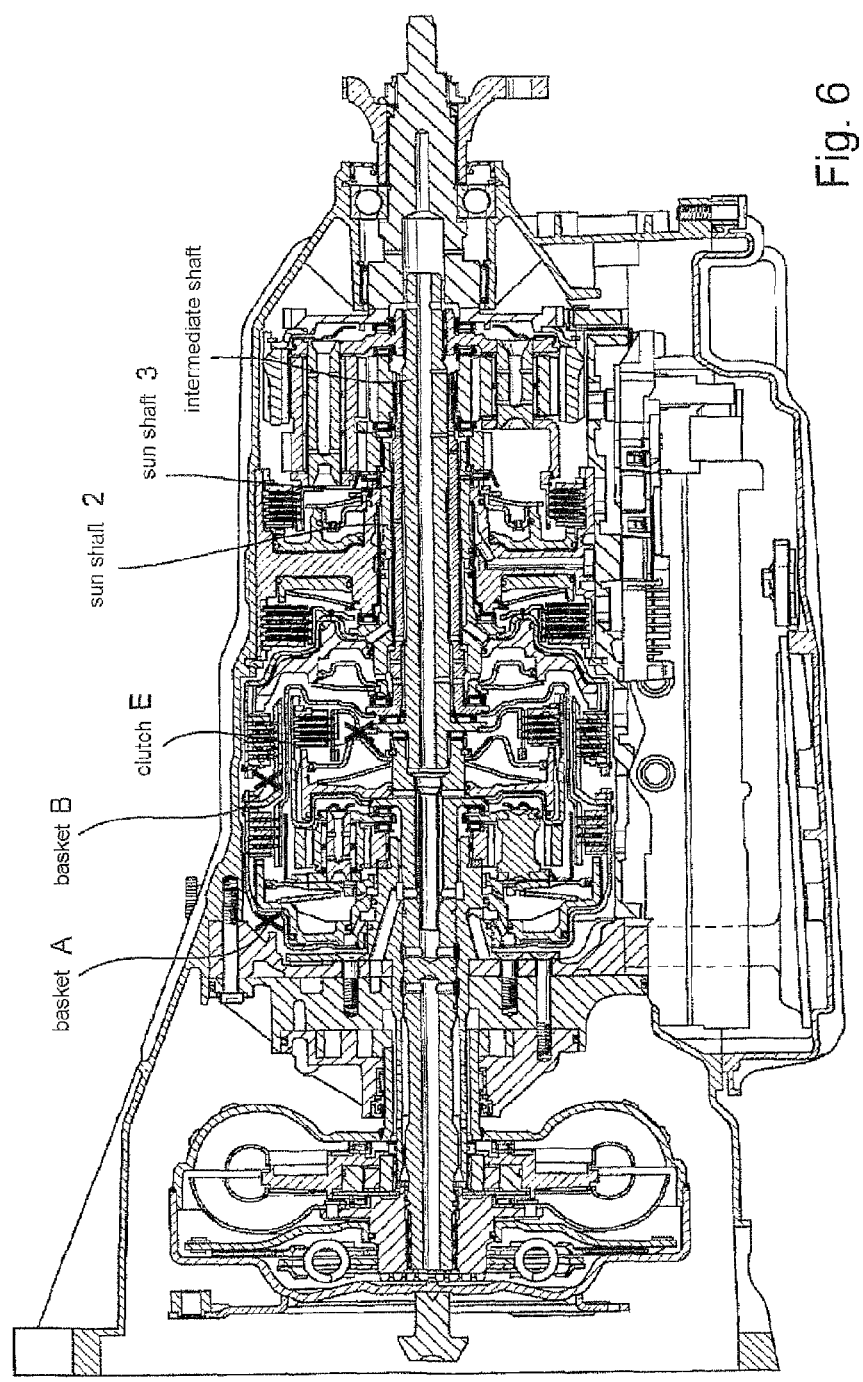
FIG. 6 shows a sixth exemplary embodiment of the invention.

FIG. 6 shows an exemplary model of an exemplary, to a certain extent inventive drive train with an exemplary, partially illustrated transmission device 2 according to the invention.

The designations "basket A", "basket B" and "basket E" indicate exemplary positions where the torsion damper provided in the Lepelletier transmission can be provided. Basket A is therefore intended to indicate a position on or inside a disk carrier of the clutch A and correspondingly "basket B" and "basket E" are intended to indicate a position provided on or inside the disk carrier of the clutch B or the clutch E.

Figure 7:
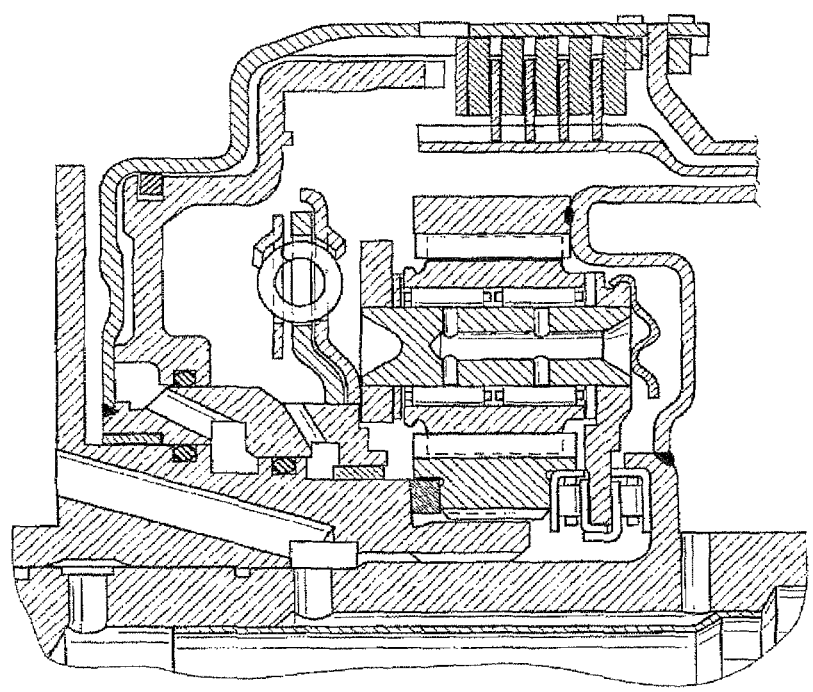
FIG. 7 shows a seventh exemplary embodiment of the invention.

FIGS. 7 to 9 show various exemplary models (each partially illustrated) of various exemplary motor vehicle drive trains according to the invention—or of one respective exemplary motor vehicle drive train according to the invention—or of an exemplary transmission device according to the invention.

In the configuration according to FIG. 7, the torsion damper is to be arranged inside the Lepelletier transmission essentially in the way which has already been explained with respect to FIG. 1. In the configuration according to FIG. 8, the torsion damper 64 is to be arranged within the Lepelletier transmission essentially in the way which has already been explained with reference to FIG. 2, and in the configuration according to FIG. 9 the torsion damper is to be arranged essentially in the way which has already been explained with respect to FIG. 3.

FIGS. 11, 12, 13, 14, 15 and 16 show the amplitudes of the third order of engine plotted against the engine speed, respectively for the engine on the one hand and for the differential on the other.

Figure 11:
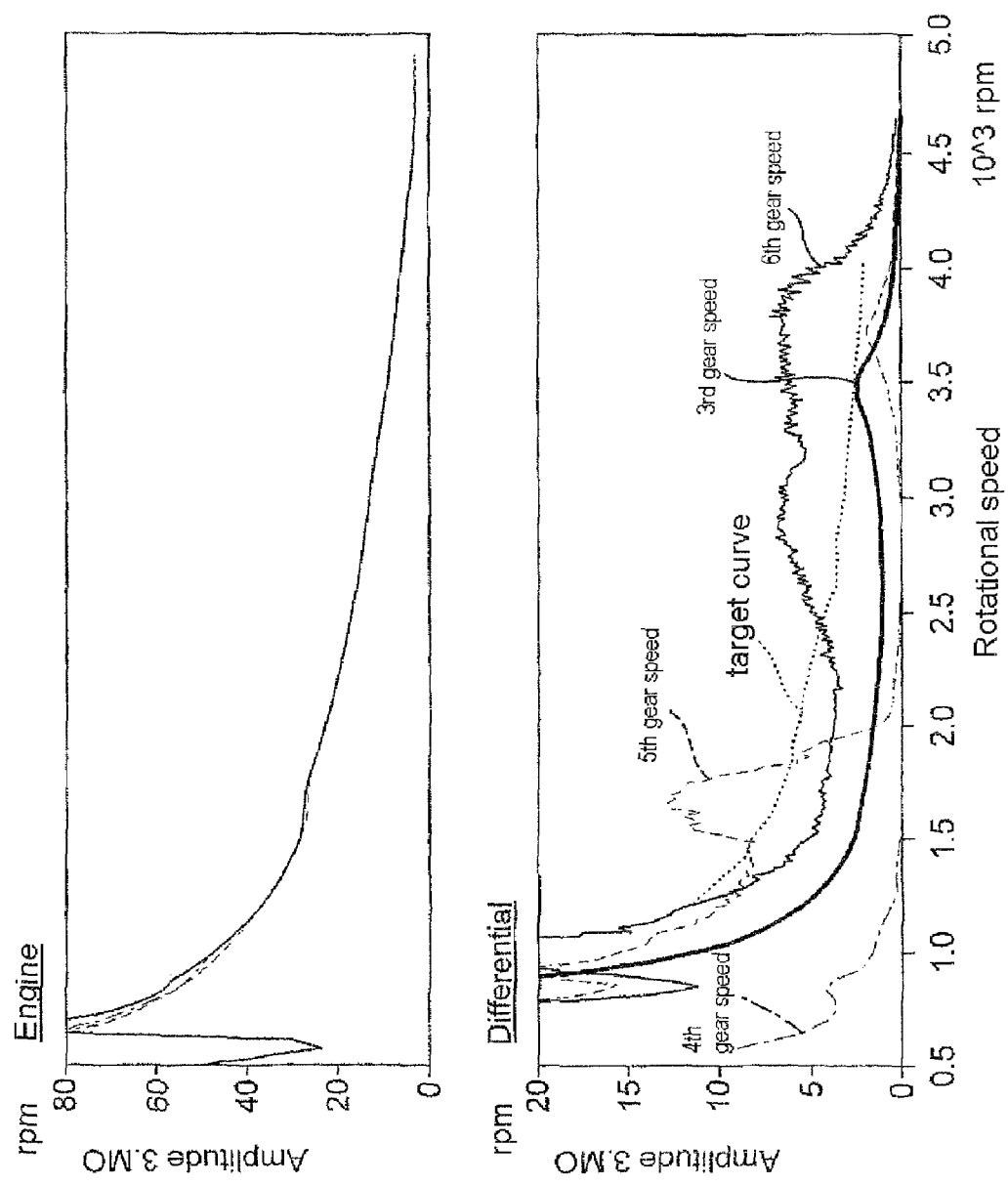
FIG. 11 to FIG. 16 show exemplary profiles of the third order of engine plotted against the rotational speed of the engine and the differential.
Figure 12:
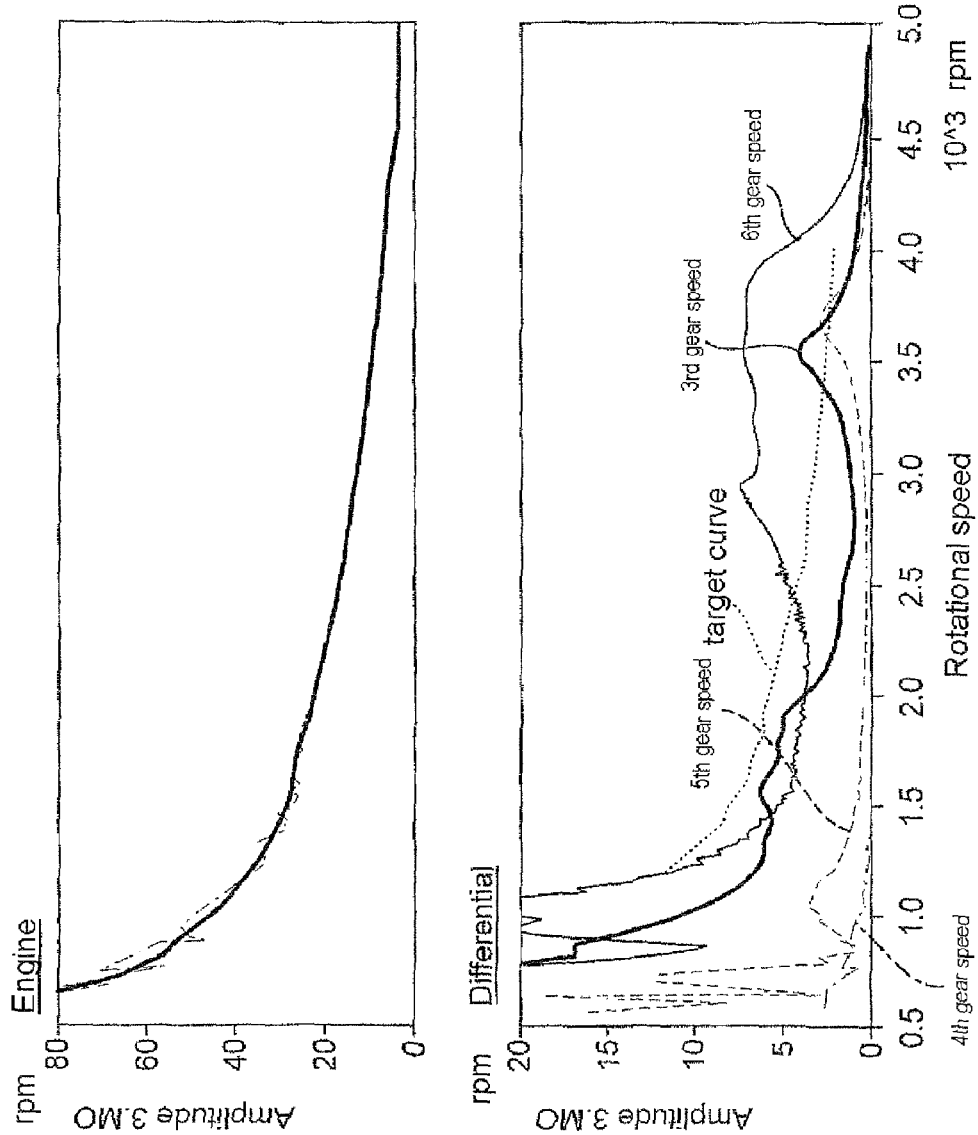

FIG. 11 relates here to an exemplary refinement in which a transmission-internal damper is not provided in accordance with the invention. FIG. 12 relates here to an exemplary refinement in which a damper which is internal to the transmission is provided in basket A.

Figure 13:
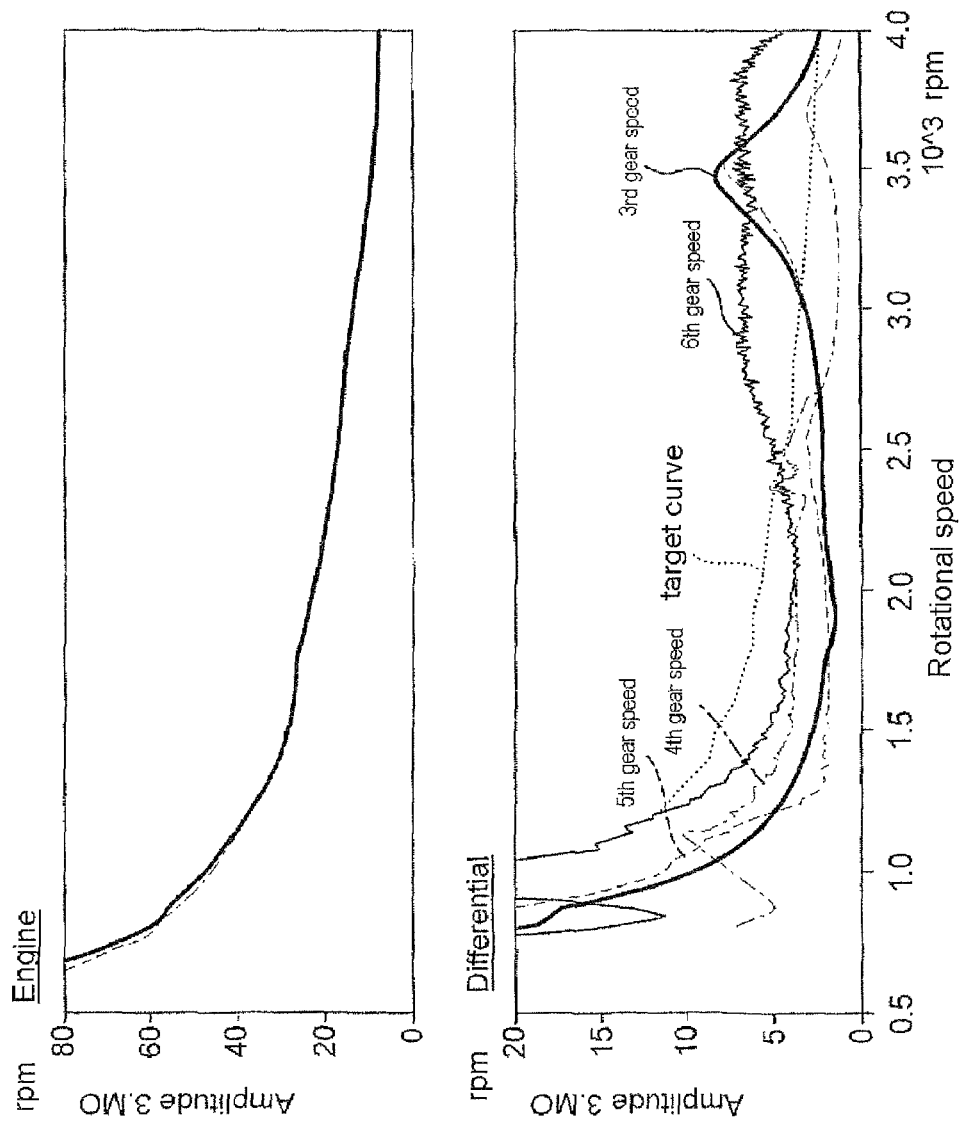

FIG. 13 relates here to an exemplary configuration in which a transmission-internal damper is provided in the basket B.

Figure 14:
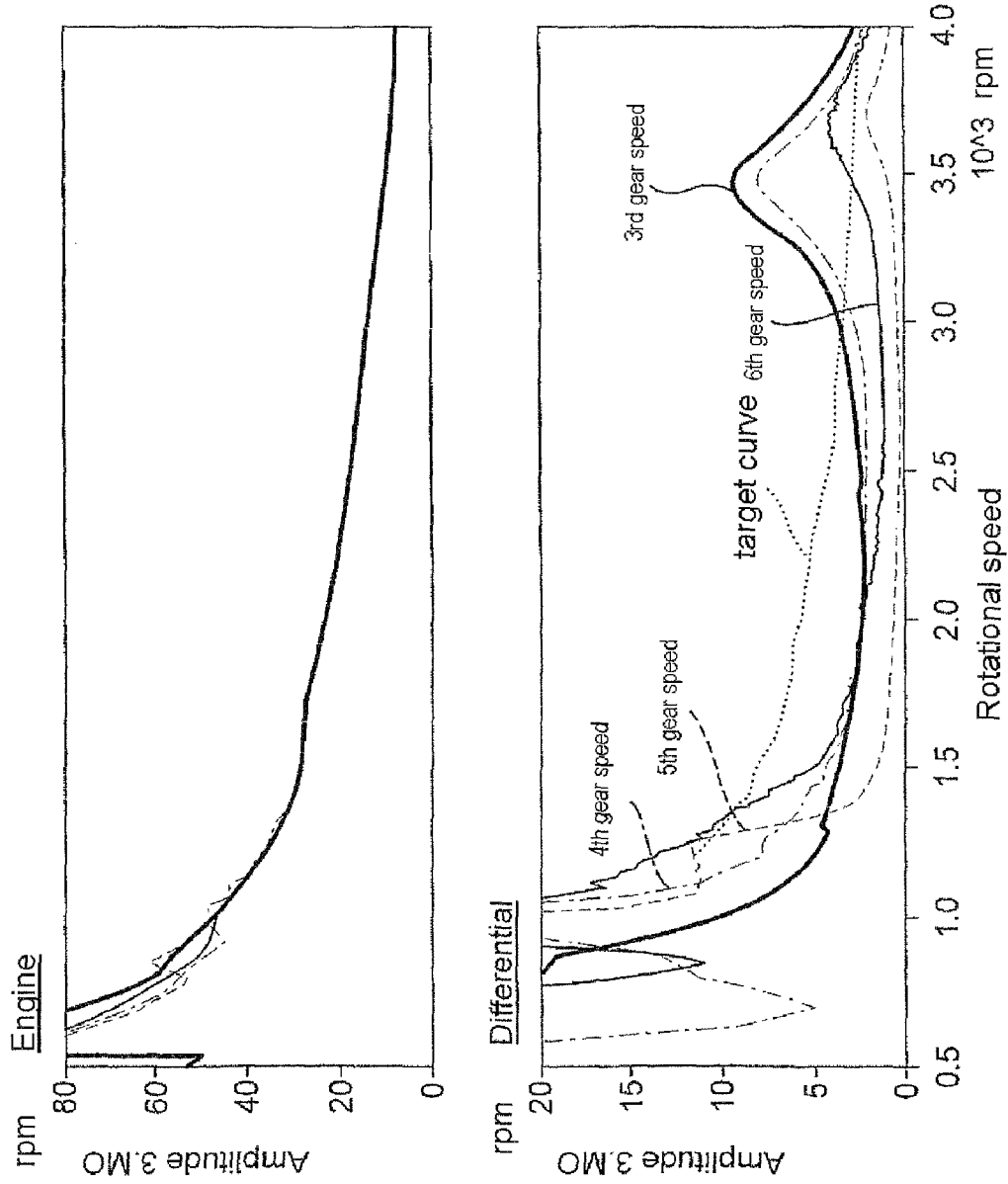

FIG. 14 relates here to an exemplary configuration in which a transmission-internal damper is provided in the basket B.

Figure 15:
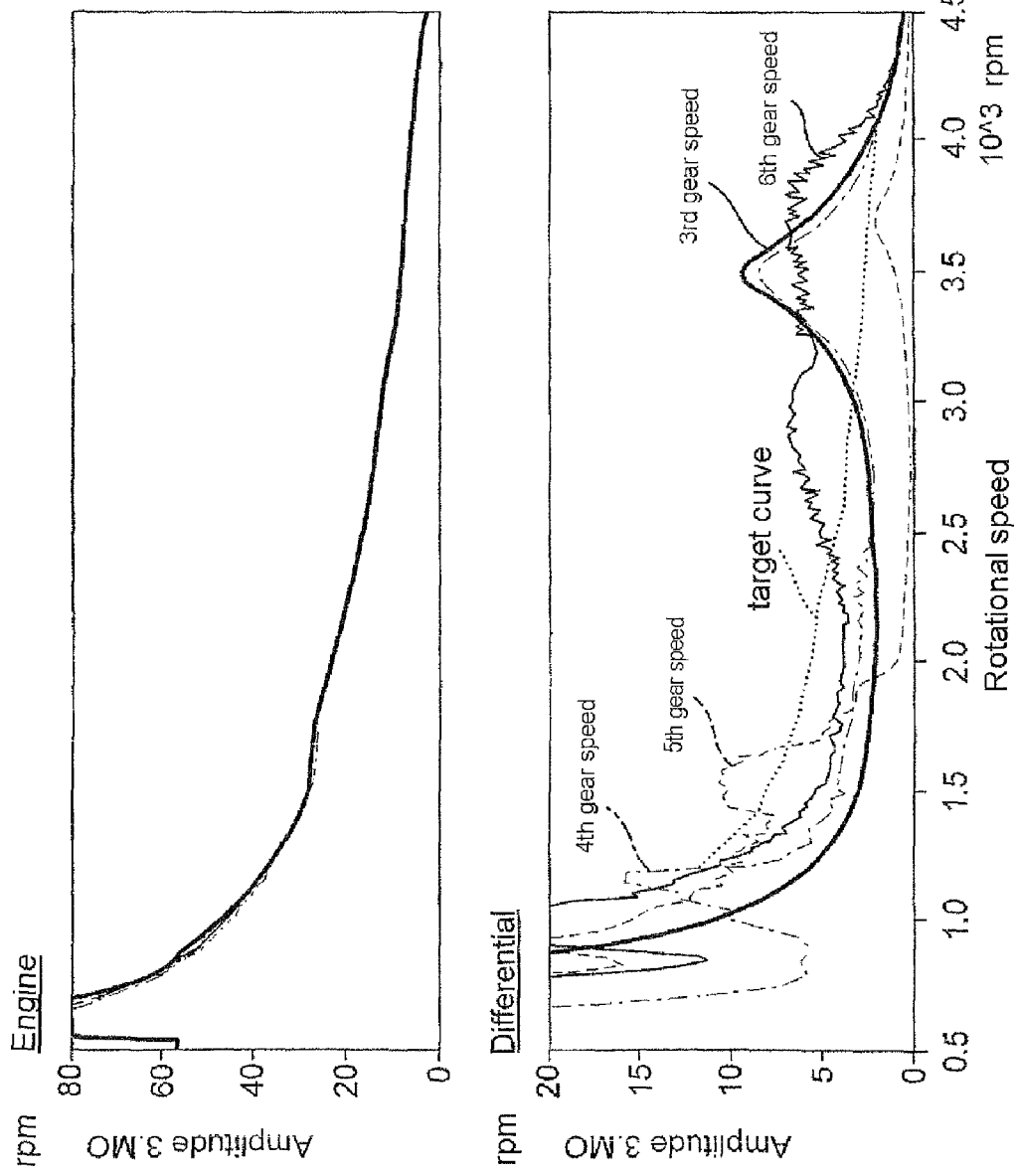

FIG. 15 relates here to an exemplary configuration in which a transmission-internal damper is provided in the sun shaft 2 (also referred to as the second sun shaft).

Figure 16:
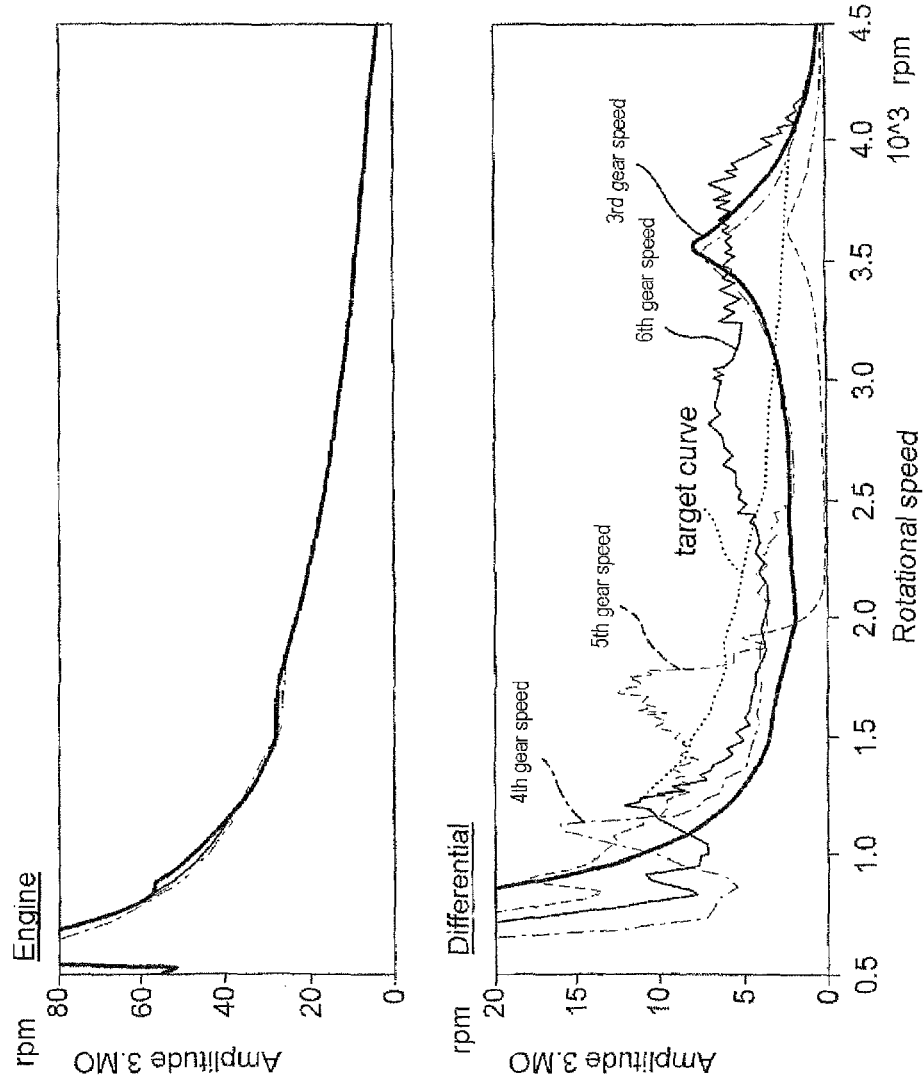

FIG. 16 relates here to an exemplary configuration in which a transmission-internal damper is provided in the sun shaft 3 (also referred to as the third sun shaft).

Figure 17:
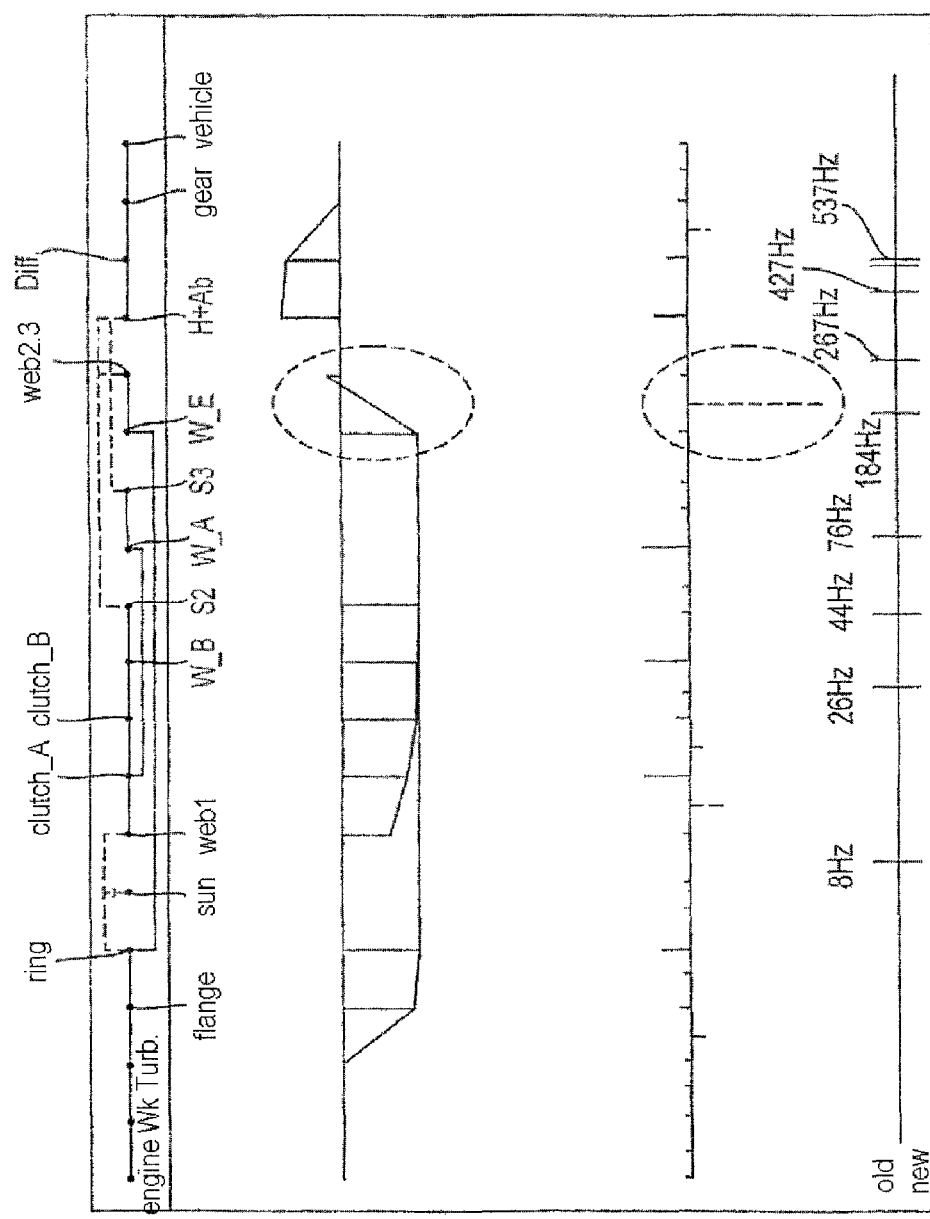
FIG. 17 shows exemplary natural modes (simulation model) of an exemplary motor vehicle transmission or an exemplary motor vehicle drive train.

FIG. 17 shows exemplary natural modes of a simulation model.

REFERENCE NUMERAL

1 Motor vehicle drive train
2 Motor vehicle transmission device
10 First component transmission of 2
12 Second component transmission of 2
14 Sun gear of 10
16 Planet gear of 10
18 Planet carrier of 10
20 Ring gear of 10
22 Small sun gear of 12
24 Large sun gear of 12
26 Long planet gear of 12
28 Short planet gear of 12
30 Planet carrier for 26, 28 of 12
32 Ring gear of 12
34 Input component or input shaft of 10
36 Output component or output shaft of 12
38 Torque converter
40 Torsion vibration damper
42 Converter housing
44 Engine shaft 46 Converter lockup clutch
48 Second sun shaft
50 Third sun shaft
52 Intermediate shaft
54 First clutch (clutch A)
56 Second clutch (clutch B)
58 Third clutch (clutch E)
60 Fourth clutch (clutch C)
62 Fifth clutch (clutch D)
64 Torsion damper
64a Torsion damper
64b Torsion damper
64c Torsion damper
64d Torsion damper
64e Torsion damper

The invention claimed is:

1. A motor vehicle transmission device, comprising:
a Lepelletier transmission forming a plurality of shiftable gear speeds,
wherein at least one torsion damper is provided in the Lepelletier transmission,
wherein the Lepelletier transmission has a first component transmission and a second component transmission, the first component transmission has a sun gear, a plurality of planet gears, a ring gear and a planet carrier, and the second component transmission forms a Ravigneaux transmission and therefore has a small sun gear, a large sun gear, long planet gears, short planet gears, a planet carrier for the long planet ears and the short planet gears and a ring gear, a first clutch is provided in torque flux or force flux between the planet carrier of the first component transmission and the small sun gear of the Ravigneaux transmission, a second clutch is provided in the torque flux or the force flux between the planet carrier of the first component transmission and the large sun gear of the Ravigneaux transmission, and a third clutch is provided by means of which a rotationally fixed coupling can be produced and released between the ring gear of the first component transmission and the planet carrier of the Ravigneaux transmission,
wherein the first clutch and/or the second clutch and/or the third clutch are configured as a multi-disc clutch, and
wherein the torsion damper is integrated in a disc carrier of the first clutch and/or in a disc carrier of the second clutch and/or in a disc carrier of the third clutch.

2. The motor vehicle transmission device as claimed in claim 1, wherein the torsion damper has a plurality of springs which are each configured as helical springs.

3. The motor vehicle transmission device as claimed in claim 1, wherein the springs are supported, in a contact-forming fashion, on the disc carrier of the first clutch and/or on the disc carrier of the second clutch and/or on the disc carrier of the third clutch.

4. The motor vehicle transmission device as claimed in claim 1, wherein the torsion damper is arranged in the force flux or the torque flux, between the planet carrier of the first component transmission and the first clutch.

5. The motor vehicle transmission device as claimed in claim 1, wherein the torsion damper, is arranged in the force flux or the torque flux, between the planet carrier of the first component transmission and the second clutch.

6. The motor vehicle transmission device as claimed in claim 1, wherein the torsion damper is arranged in the force flux or the torque flux, between the third clutch and the planet carrier of the Ravigneaux transmission.

7. The motor vehicle transmission device as claimed in claim 1, wherein the torsion damper is arranged in the force flux or the torque flux, between the second clutch and the large sun gear of the Ravigneaux transmission.

8. The motor vehicle transmission device as claimed in claim 1, wherein the torsion damper is arranged in the force flux or the torque flux, between the first clutch and the small sun gear of the Ravigneaux transmission.

9. The motor vehicle transmission device as claimed in claim 1, wherein the torsion damper is arranged in the force flux or the torque flux, between the first clutch and the second clutch.

10. A motor vehicle drive train, comprising:
an internal combustion engine for driving the drive train; and
the motor vehicle transmission device as claimed in claim 1.

11. The motor vehicle drive train as claimed in claim 10, wherein a torque converter and converter lockup clutch are provided between the internal combustion engine and the transmission device.

* * * * *